June 24, 1930.   C. H. RUTH   1,766,457
WAVE AND TIDE MOTOR
Filed April 23, 1928   3 Sheets-Sheet 1

INVENTOR
CHARLES H. RUTH
BY Munn & Co.
ATTORNEYS

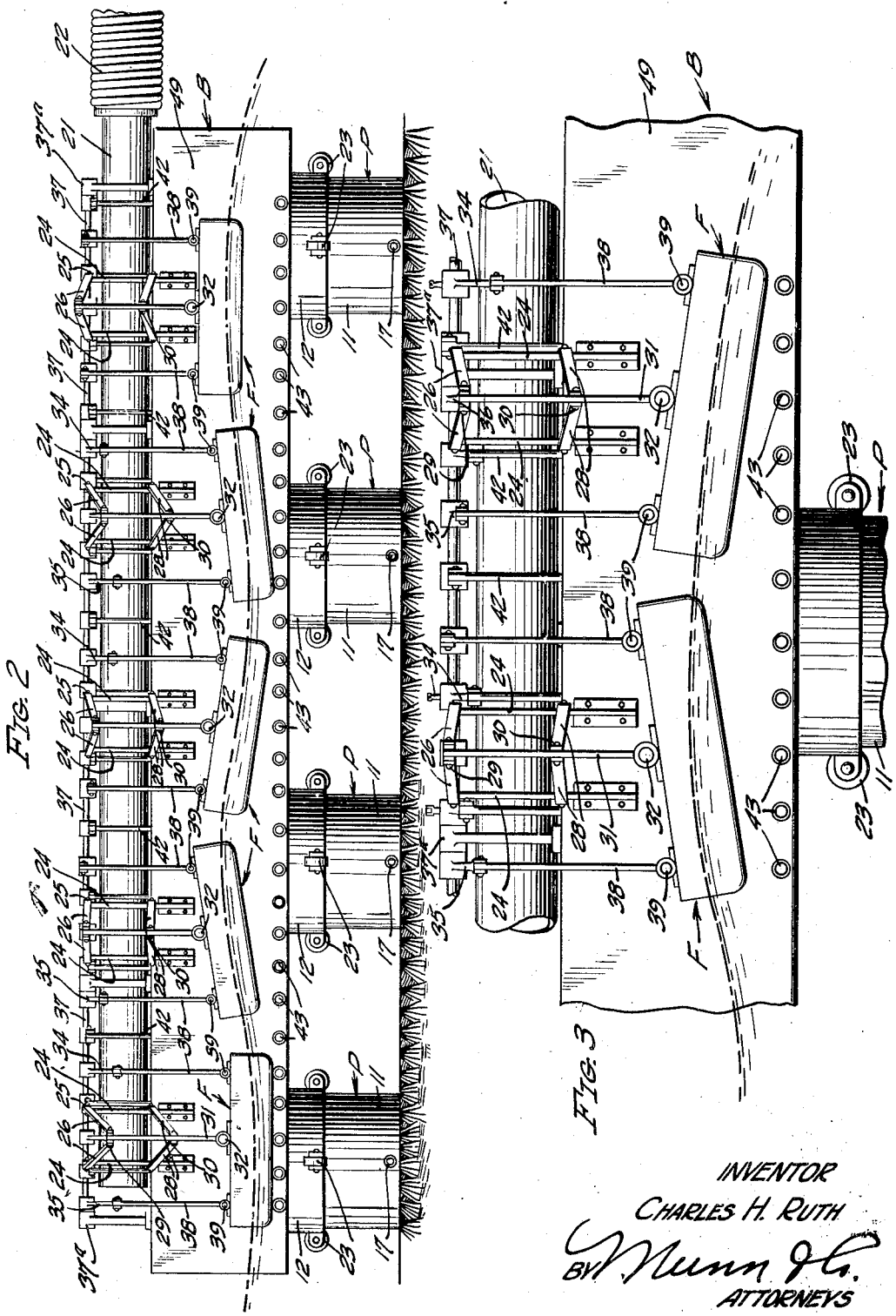

June 24, 1930.    C. H. RUTH    1,766,457
WAVE AND TIDE MOTOR
Filed April 23, 1928    3 Sheets-Sheet 3
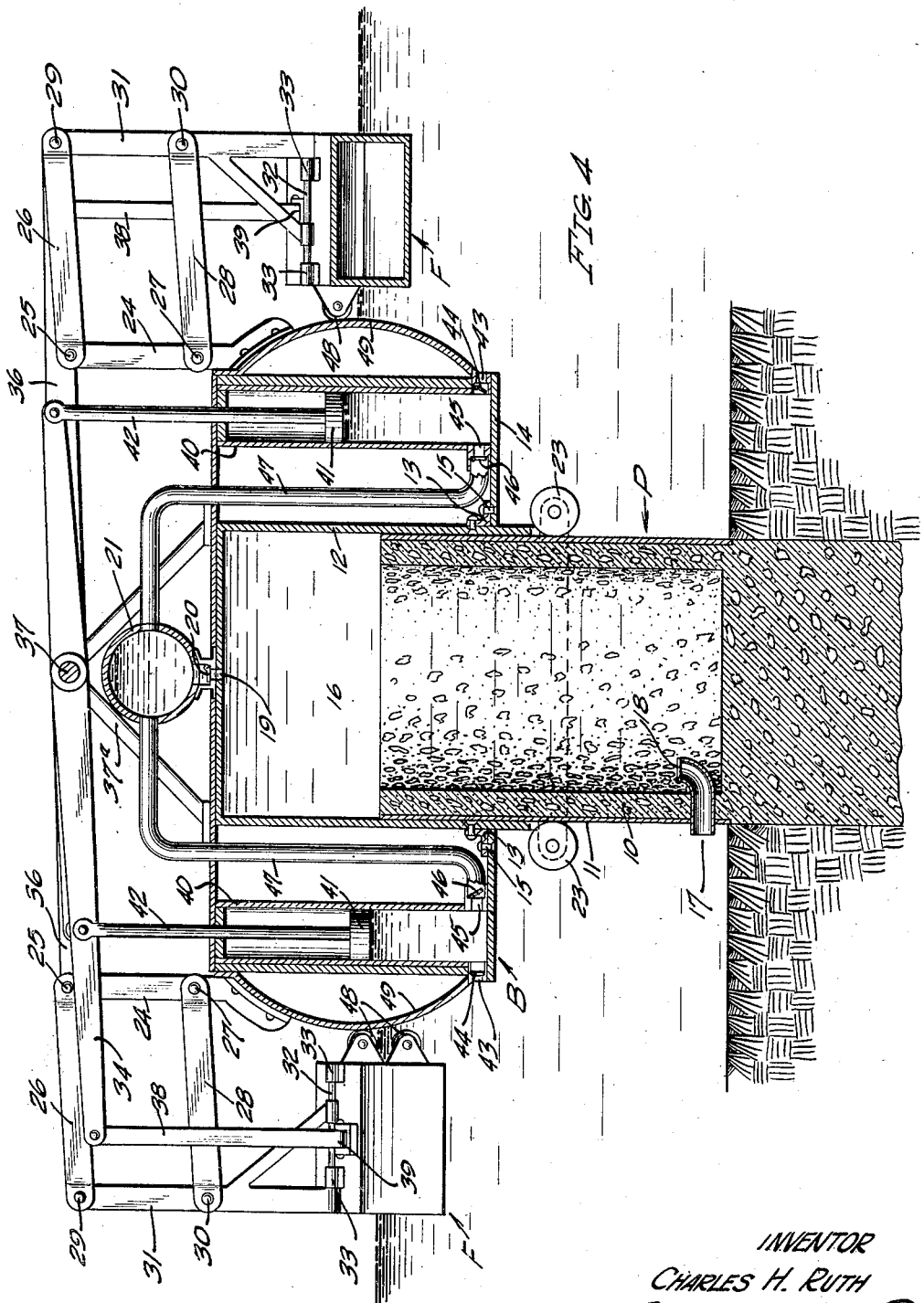
INVENTOR
CHARLES H. RUTH
ATTORNEYS Patented June 24, 1930

1,766,457

UNITED STATES PATENT OFFICE

CHARLES H. RUTH, OF HUNTINGTON PARK, CALIFORNIA

WAVE AND TIDE MOTOR

Application filed April 23, 1928. Serial No. 272,248.

My invention relates to and has for a purpose the provision of a motor by which the motion of waves, swells, and tides of a body of water can be efficiently and economically utilized to perform useful work.

It is a further purpose of my invention to provide a motor of the above described type which is characterized by a plurality of floats capable of being mounted in a body of water for movement in response to wave action and adapted for operative connection to instrumentalities to be actuated; with means responsive to variations in level of the body of water, such as resulting from tidal action, for maintaining the floats in a fixed position relative to the surface of the water, so that the floats will at all times be exposed to maximum wave action irrespective of a rising and falling of the water level.

It is a further purpose of my invention to provide a motor by which wave and tide motion is adapted to be utilized to effect pumping of water from the body of water in which the motor is situated, to a storage tank or other desired place.

I will describe only one form of wave and tide motor embodying my invention and will then point out the novel features in claims.

In the accompanying drawings,

Fig. 2 is a view in side elevation of the wave and tide motor shown in Fig. 1;

Fig. 3 is an enlarged fragmentary view of the motor in side elevation; and

Fig. 4 is an enlarged sectional view taken on the line 4—4 of Fig. 1 and looking in the direction of the arrows.

Figure 1:
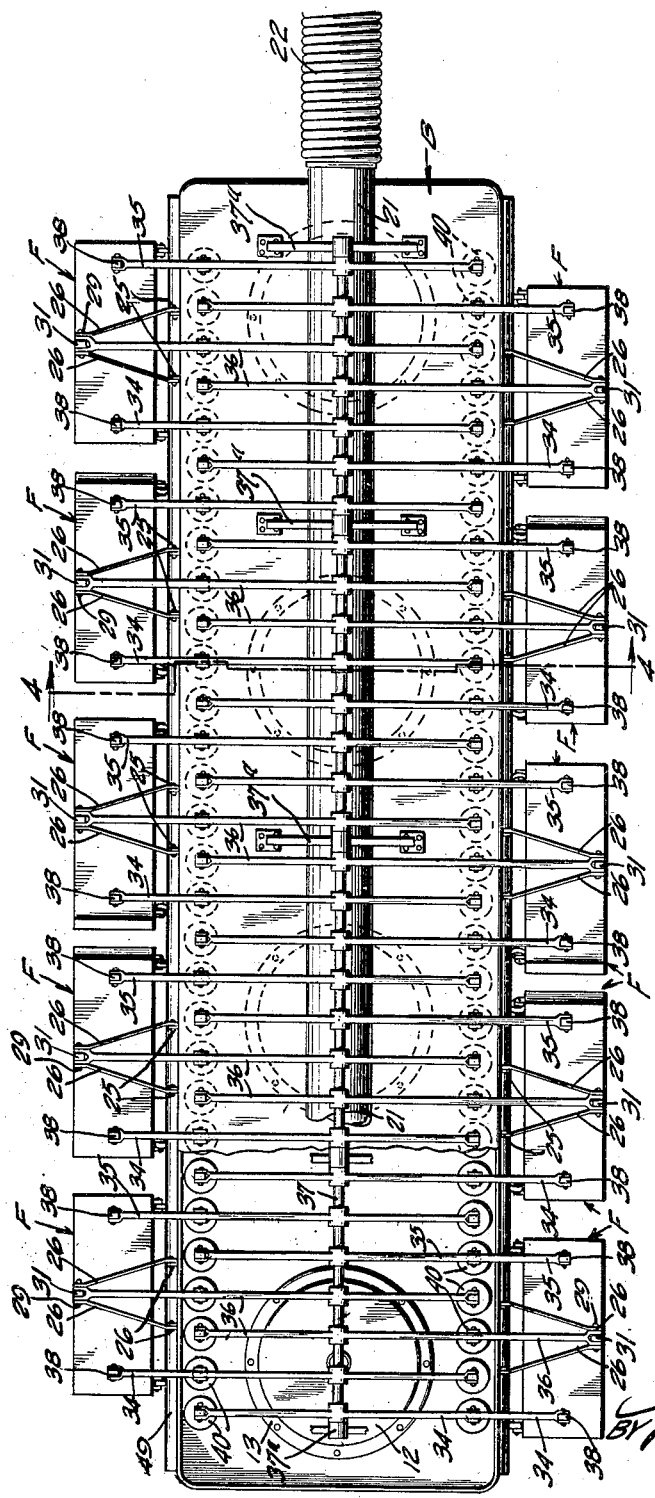
Fig. 1 is a view showing in plan, partly broken away, one form of wave and tide motor embodying my invention.

Referring specifically to the drawings in which similar reference characters designate similar parts in each of the several views, my invention in its present embodiment comprises a plurality of piers designated generally at P, and in the present instance four have been shown, although a greater or less number can be employed depending on the size of motor desired. The piers are identical in construction, and each comprises a hollow cylinder 10 of waterproof concrete or other suitable material having a closed bottom and an open top, with the outer periphery of the cylinder having secured thereon a shell 11 of metal. The piers are anchored in the bed of a body of water to occupy perpendicular positions, and preferably are arranged in a row extending substantially at right angles to the shore line and at the location of maximum wave action in the body of water.

The piers P constitute fixed supports for a buoyant body B, which in turn constitutes a support or mounting for a plurality of floats designated generally at F. The body B is preferably constructed of metal and is of rectangular form, having a closed top, closed sides, and a closed bottom provided with openings closed by inverted cup shaped heads 12 extending through the openings in the bottom wall 14 of the body to a point below the latter, and having flanges 13 secured to the bottom wall by fastening members 15. The heads 12 slidably receive the upper ends of the piers P so that the body is mounted on the piers for vertical movement, and the heads co-operate with the piers to provide closed chambers 16 therebetween to which water is adapted to be admitted through inlet ports 17 formed in the piers adjacent the bed of the body of water, and provided with check valves 18 opening inwardly of the chambers. Water is adapted to be discharged from the chambers through discharge ports 19 controlled by check valves 20 opening outwardly of the chambers; and connected to all of the discharge ports 19 is a header 21 supported on the heads 12, and into which header water discharged from the chambers is delivered.

The body B is sufficiently buoyant to respond to variations in the level of the body of water so as to rise and fall in accordance with the water level, yet is unaffected by wave action, to the end that the body will operate automatically to maintain the floats F mounted thereon, in fixed positions relative to the surface of the water so as to constantly maintain the floats in the positions wherein they will be exposed to maximum wave action irrespective of rising and falling of the water level such as would be occasioned by tidal action in the oceans.

It will be clear that according as the water level rises or falls, the capacity of the chambers 16 will be increased or decreased. This variation in capacity of the chambers is utilized to pump water from the body of water in which the motor is situated, into the header 21, through the co-action of the check valves 18 and 20. It will be evident that with water filling the chambers, as the body B rises, the valves 18 will open and the valves 20 will close, so that water is sucked into the chambers through the inlet ports 17; and as the body lowers, the valves 18 will close while the valves 20 will open and water is expelled from the chambers through the discharge ports 19 into the header 21. Water from the header is adapted to be conducted to shore through a suitable flexible pipe line 22 connected to the header and leading to a suitable storage tank (not shown) on the shore, or to any place desired. It will be apparent that the vertical movements of the body B in response to variations in water level could as well be utilized to perform useful work other than the pumping of water, by employing suitable power transferring mechanism (not shown). To prevent possible binding of the body B on the piers P, should the body tend to tilt on the piers during its rising and falling movements, the lower ends of the heads 12 are provided at circumferentially spaced intervals with anti-friction rollers 23 which have rolling contact with the shells 11 of the piers.

In order to support the floats F for movement on the body B and in a manner to render them responsive most effectively to wave action, as well as to utilize movements imparted to the floats by the action of the waves to perform useful work, I provide the following mechanism:

From a consideration of Fig. 1, it will be seen that two rows of floats are provided, one row extending along either side of the body B and in the present instance each row consisting of five floats. All of the floats are identical in construction, and each is in the form of a hollow watertight rectangularly shaped metal body. As the mechanism for mounting each float for movement on the body B in response to wave action, and for utilizing movement of each float to perform useful work, is identical for all the floats, a description of the mechanism for one float will suffice for all.

The mechanism for each float comprises a pair of spaced apart upstanding brackets 24 secured at a side edge of the body B. Pivotally connected to the brackets at 25 are one of the ends of a pair of links 26, while at a point below the links 26 are pivotally connected to the brackets at 27, one of the ends of a second pair of links 28. The links of each pair converge towards each other towards their other ends, which latter are pivotally connected at 29 and 30 to a hanger 31, so that the links constitute a parallel motion connection between the bracket and hanger for mounting the latter for movement in a vertical plane.

The lower end of the hanger 31 is pivotally connected to a shaft 32 extending transversely of a float F and secured in brackets 33 fixed to the float F medially between its ends, so that the float is mounted on the hanger for rocking movement about the axis of the shaft 32 and is also free to move upward or downward bodily by virtue of the parallel motion connection afforded between the hanger 31 and brackets 24, by the links 26 and 28, so that the float will respond to a maximum degree to rocking as well as rising and falling movements of the waves.

To utilize the movements of the floats to perform useful work, I provide for each float a pair of levers 34 and 35, and a single lever 36 therebetween. These levers for all of the floats are pivoted between their ends on a horizontally disposed shaft 37 extending longitudinally of the body B directly above the heads 12 and supported at intervals by brackets 37ª secured to the tops of the heads.

The levers 34, 35, and 36 are each provided with a long arm and a short arm, the long arm of the lever 36 being pivotally connected to the hanger 31 at 29, while the long arms of the levers 34 and 35 are pivotally connected to the upper ends of arms 38, pivotally connected at their lower ends to a float F adjacent the ends of the latter as indicated at 39. It will be clear that as the float is rocked about the axis of the shaft 32 in response to rocking movement of the waves, the levers 34 and 35 will as a result be rocked about the axis of the shaft 37; and as the float is moved bodily upward and downward in response to rising and falling movements of the waves or swells, the lever 36, as well as the levers 34 and 35, will be rocked about the axis of the shaft 37.

The rocking movements imparted to the levers 34, 35, and 36 by the float are utilized in the present instance to operate pumps for pumping water from the body of water in which the motor is situated, into the header 21. For this purpose two pumps are provided for each lever, and the pumps are arranged in two rows extending longitudinally of the body B and disposed at the inner sides of the side walls of the body directly below the long and short arms of the levers as is shown clearly in Fig. 1.

The pumps are all of identical construction so that a description of one will suffice for all. Each pump comprises a vertically disposed cylinder 40 fixed in the body B and having a piston 41 working therein and connected by means of a piston rod 42 extending through the closed top of the body B, to a long or short arm of a lever 34, 35, or 36 as shown in Fig. 4, so as to be reciprocated in the cylinder in response to rocking movement of the lever.

The cylinder 40 of each pump is provided with an intake port 43 in communication with the body of water in which the motor is situated, and the port is controlled by a check valve 44 opening inwardly of the cylinder. The cylinder is also provided with a discharge port 45 controlled by a check valve 46 opening outwardly of the cylinder; and connecting the discharge port of each cylinder with the header 21, is a conduit 47 extending through the top of the body B.

It will be evident that as a piston 41 is reciprocated in its cylinder 40 in response to rocking movement of the particular lever 34, 35, or 36 to which the piston rod 42 of the piston is connected, water will be alternately drawn into the cylinder through the intake port 43 and expelled from the cylinder through the discharge port 45 into the header 21, thus effecting pumping of the water.

To guide the floats and prevent the latter from damaging the sides of the body B, the sides of the floats confronting the side walls of the body are provided with anti-friction rollers 48 which have rolling contact with the side walls of the body, curved outwardly as shown at 49 in Fig. 4 to conform to the arc of travel of the floats in their bodily upward and downward movements.

From the foregoing description it will be manifest that I have provided a motor by which the rocking as well as the rising and falling movements of the waves, and the rise and fall of water level, are utilized to perform useful work; and that the wave actuated floats are at all times maintained exposed to maximum wave action so as to operate at maximum efficiency irrespective of variations in water level.

Although I have herein shown and described only one form of wave and tide motor embodying my invention, it is to be understood that various changes and modifications may be made therein without departing from the spirit of the invention and the spirit and scope of the appended claims.

I claim:

1. A motor of the character described comprising a float, means for mounting the float in a body of water for movement in response to wave action, and mounting means for the first means comprising a body of such buoyancy and displacement as to be unaffected by wave action, yet responsive to a variation in water level to move upwardly or downwardly according as the water level rises or falls so as to maintain the float at a fixed elevation relative to the surface of the water, and a pier on which the body is mounted for vertical movement, adapted to be fixed in the bed of the body of water.

2. A motor of the character described comprising a float, means for mounting the float in a body of water for movement in response to wave action, and mounting means for the first means comprising a body of such buoyancy and displacement as to be unaffected by wave action, yet responsive to a variation in water level to move upwardly or downwardly according as the water level rises or falls so as to maintain the float at a fixed elevation relative to the surface of the water, and a pier on which the body is mounted for vertical movement, adapted to be fixed in the bed of the body of water, the pier and body co-operating to provide a piston and cylinder unit and having valved means for controlling the admission and discharge of water to and from the unit in a manner to effect pumping of the water in response to movement of the body on the pier.

3. A motor of the character described comprising a hollow pier adapted to be anchored in the bed of a body of water to occupy a vertical position, a buoyant body mounted for vertical movement on the pier in response to rise and fall of the water level and closing the upper end of the pier to provide a chamber between the two, an inlet port in the pier through which water is adapted to be admitted to the chamber, a valve controlling the inlet port and opening inwardly of the chamber, an outlet port in the buoyant body through which water is adapted to be discharged from the chamber, and a valve controlling the outlet port and opening outwardly of the chamber, whereby according as the buoyant body moves upwardly water will be drawn into the chamber through the inlet valve, and as the body moves downwardly, water will be expelled from the chamber through the outlet valve, to thereby effect pumping of the water.

4. A motor of the character described comprising a support adapted to be anchored in the bed of a body of water, a buoyant body mounted for movement on the support in response to rise and fall of the water level, the support and body having portions co-operating to provide a chamber, the capacity of which is increased or decreased according as the buoyant body moves in one direction or another, and valved means for controlling the intake and discharge of water to and from the chamber in such manner that according as the capacity of the chamber is increased, water will be drawn into the chamber and as the capacity of the chamber decreases, water will be expelled from the chamber, all in a manner to effect a pumping of water through the chamber.

5. A motor of the character described comprising a support adapted to be anchored in the bed of a body of water, a buoyant body mounted for movement on the support in response to rise and fall of the water level, the support and body having portions co-operating to provide a chamber, the capacity of which is increased or decreased according as the buoyant body moves in one direction or another, and valved means and valved ports in the support and body by which water is admitted to and discharged from the chamber according as the capacity of the chamber is increased or decreased, to thereby effect pumping of the water.

6. A motor of the character described comprising a support, a float, a bracket to which the float is connected for movement in one vertical plane, means movably connecting the support and bracket for movement of the latter in a vertical plane at an angle to the said first plane, whereby the float will be free to move in response to rocking and rising and falling movements of the waves, and means for utilizing movements of the float to perform useful work.

7. A motor of the character described comprising a support, a float, a hanger on which the float is mounted for rocking movement in one vertical plane, a pair of links pivotally connected to the support and hanger in spaced parallel relation for connecting the float to the support for vertical movement in a plane at an angle to said first plane, whereby the float will be free to move in response to rocking and rising and falling movements of the waves, and means for utilizing movements of the float to perform useful work.

8. A motor of the character described comprising a support, a float, a hanger on which the float is mounted for rocking movement in one vertical plane, a pair of links pivotally connected to the support and hanger in spaced parallel relation for connecting the float to the support for vertical movement in a plane at an angle to said first plane, whereby the float will be free to move in response to rocking and rising and falling movements of the waves, and means for utilizing movements of the float to perform useful work, said last means comprising a lever pivotally mounted on the supports, an arm pivotally connected to the lever and to the float, and a pump carried by the support and operatively connected to the lever for actuation thereby.

9. A motor of the character described comprising a support, a float, a hanger, means for connecting the float to the hanger for rocking movement of the float about one axis, links arranged in pairs diverging from each other, means for pivotally connecting the diverged ends of the pairs of links to the hanger on axes at right angles to said first axis, to dispose one pair of links above the other and in parallel relation thereto, a pair of levers pivotally mounted on the support, arms connected to the levers and to the float at points spaced from and on opposite sides of the first mentioned axis, and power transferring means connected to the levers.

10. A motor of the character described comprising a support, a float, a hanger, means for connecting the float to the hanger for rocking movement of the float about one axis, links arranged in pairs diverging from each other, means for pivotally connecting the diverged ends of the pairs of links to the hanger on axes as right angles to said first axis, to dispose one pair of links above the other and in parallel relation thereto, a pair of levers pivotally mounted on the support, arms connected to the levers and to the float at points spaced from and on opposite sides of the first mentioned axis, cylinders on the support, pistons working in the cylinders and operatively connected to the levers for actuation thereby, and valved intake and discharge ports in the cylinders through which water is adapted to be respectively drawn into and expelled from the cylinders in response to actuation of their pistons.

Signed at Los Angeles in the county of Los Angeles and State of California this 7th day of April, A. D. 1928.

CHARLES H. RUTH.